United States Patent [19]

Franklin

[11] 3,902,460
[45] Sept. 2, 1975

[54] QUAIL FEEDER
[76] Inventor: Hans Joe Franklin, 1809 N. Russell, Pampa, Tex. 79065
[22] Filed: Oct. 4, 1974
[21] Appl. No.: 512,107

[52] U.S. Cl............................................... 119/52 R
[51] Int. Cl.²......................................... A01K 39/00
[58] Field of Search.......................... 119/52, 59, 63

[56] References Cited
UNITED STATES PATENTS
| | | | |
|---|---|---|---|
| 1,561,644 | 11/1925 | Hanson | 119/52 R |
| 2,737,152 | 3/1956 | DuRall | 119/52 R |
| 3,372,676 | 3/1968 | Williams | 119/52 R |

Primary Examiner—G. E. McNeill
Assistant Examiner—Daniel J. Leach
Attorney, Agent, or Firm—David V. Trask

[57] ABSTRACT

A quail feeder is constructed with a storage chamber mounted atop a feeding chamber. Distribution apparatus is mounted at the top of the feeding chamber to receive grain from the storage chamber and discharge it into one or more troughs located near the top of the feeding chamber. A trough guard is located in spaced relation to the trough and the bottom of the feeding chamber to prevent feeding by birds or animals other than quail. This objective is accomplished by the spatial arrangement of the elements to accommodate the anatomy of a quail but no other species.

10 Claims, 3 Drawing Figures

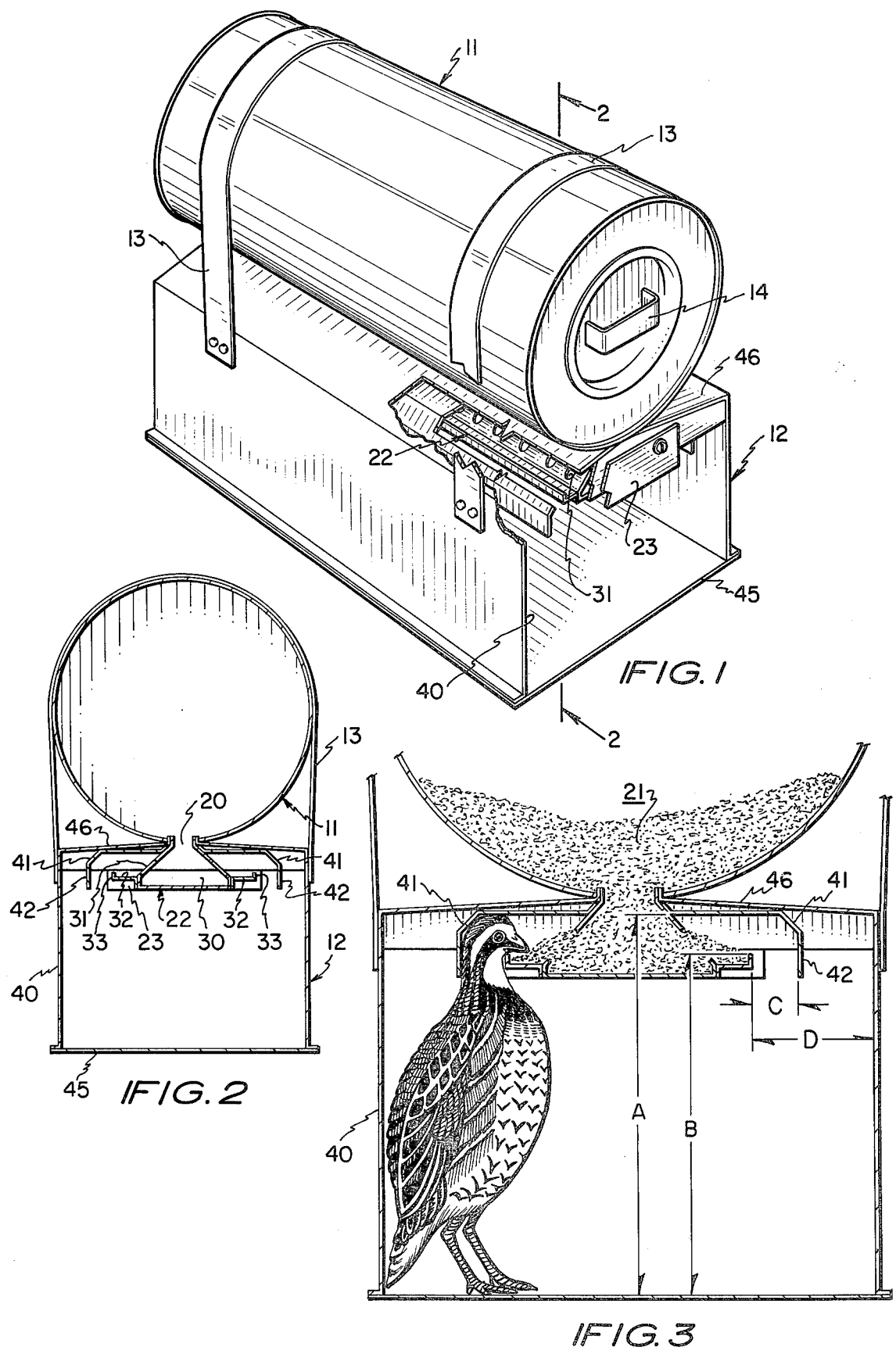

QUAIL FEEDER

BACKGROUND OF THE INVENTION

1. Field: This invention relates to the conservation of wildlife and pertains specifically to the feeding of selected species of birds, notably quail.

2. State of the Art: The conservation of game birds, such as quail, involves feeding grain during periods of low food supply. These periods generally coincide with periods of bad weather, such as when the feeding habitat of the quail is frozen so that seeds are unavailable to them. During these periods, competition for food is heightened, and grain distributed specifically for the conservation of quail is largely consumed by other species, making the effort relatively ineffective as well as costly. Heretofore, no reliable means for selectively feeding quail throughout a large region has been available.

SUMMARY OF THE INVENTION

This invention provides a feeder structured to permit access to grain by mature quail while excluding substantially all other species of wildlife. The feeder includes a storage chamber for grains, thus assuring a food supply over prolonged periods without undue vigilance. Moreover, feeding is sufficiently difficult from the claimed feeder that a quail must be motivated by hunger to utilize this source of food. Thus, if other food is readily available, the food supply in the feeder is not wasted.

Grain is provided from storage to a feeding chamber enclosed except for one or both ends. One or more feeding troughs are suspended within this chamber for protection from the elements. The troughs are in association with other structure which, by virtue of their spatial relationships, constitute means for excluding other species from the feeding troughs. The grain is thus presented at liberty to quail of sufficient size while it is substantially unavailable to species lacking the unique anatomy of quail.

The feeders of this invention function to conserve a substantial percentage of the breeding population of a desired species of bird while excluding species of less interest. Although this invention is described with particular reference to mature quail, the teachings of this disclosure can be applied to the conservation of other species of wildlife as well as other segments of the quail population.

BRIEF DESCRIPTION OF THE DRAWINGS

In the drawings which illustrate what is presently regarded as the best mode for carrying out the invention, FIG. 1 is a perspective view of a quail feeder of this invention;

FIG. 2 is a view in section taken along the line 2—2 of FIG. 1 and viewed in the direction of the arrows; and FIG. 3 is a fragmentary enlargement of FIG. 2 showing a mature quail in feeding position.

DESCRIPTION OF THE ILLUSTRATED EMBODIMENT

As best illustrated by FIG. 1, the quail feeder of this invention may be embodied as a storage drum 11 mounted atop a feeding chamber 12 which also serves as a support base. As shown, the drum 11 is held in place by means of straps 13. Grain is supplied to the drum 11 through an opening on one end, shown closed by a conventional cover 14.

Referring to FIGS. 2 and 3, the drum 11 is slotted along its region of attachment to the feeding chamber 12 to form a spillway 20 for grain 21 stored within the drum 11 to flow into distributing apparatus 22, mounted directly beneath, at the top of the feeding chamber by means of end plates 23. This suspended apparatus 22 receives grain from the drum 11 into a distribution chamber 30, from which it flows through spaced apertures 31 out into troughs 32 mounted to extend substantially the entire length of the feeding chamber 12. The troughs are closed at each end by the end plates 23. An upstanding spill guard 33 at the distal end of each trough checks the flow of grain across the trough 32. The vertical and horizontal spacings of the tops of the apertures 31 and the tops of the spill guards 33 are selected such that the grain can assume its inherent angle of repose without overflowing the spill guard. The shape of the distribution chamber 30 is somewhat arbitrary except that its bottom width (as viewed in FIGS. 2 and 3) should be selected to locate the troughs 32 appropriately with respect to the side walls 40 of the feeding chamber 12. A barrier 41 (sometimes called a trough guard) is mounted in association with each trough 32 as shown to locate a depending barrier member 42 approximately parallel to and spaced from a corresponding spill guard. The spatial relationships of the barrier members 41, side walls 40, bottom plate 45, and spill guards 33 are important to the proper functioning of the feeder.

As noted hereinbefore, an important aspect of this invention lies in the proper selection of certain dimensional relationships of the structural components. Referring specifically to FIG. 3, dimensions A, B, C and D are selected such that a mature quail, sufficiently motivated by hunger, can, with effort, feed from the troughs 32. To do so, it is necessary for the bird to enter the tunnel formed by the side walls 40, base plate 45 and top 46 of the feeding chamber 12. It must then stand substantially erect to reach the vicinity of the trough 32. It must additionally turn its head sideways (as viewed in FIG. 3) to pass between the spill guard 33 and barrier member 42 (dimension C) and then turn its head forward again to reach the grain 21. In this position, the bird must necessarily hold its head in contact with, or at least near, the top of the barrier plate 41. It must thus be stretched to a height approximately determined by dimension A yet capable of inserting its bill through the space determined by the difference between dimensions A and B. Ordinarily quail will stand with a wall 40 to one side and then turn their heads sideways to feed. The dimensions C and D cooperatively limit the size and shape of birds capable of standing erect against the wall 40 while still reaching the trough 32 with their bills or beaks.

The anatomy of a quail, with its relatively long, plump body with legs located substantially rearward and with relatively small head and short beak, is unique within its normal habitat. In any selected region, the quail population may predominate in somewhat smaller or larger mature birds, depending on the species of interest, local climatic conditions or other factors. Accordingly, the dimensions A, B, C and D appropriate for one location may not be suitable for another location, but suitable modification will be apparent to those familiar with the local bird populations in view of the teachings of this disclosure. As an example, a quail feeder of this invention generally suitable for use in the south central United States, notably throughout the state of Texas, utilizes dimensions, in inches, of approximately $A=8-9$, $B=7-8$, $C=1-1\frac{1}{2}$ and $D=3-4$.

Of course, these dimensions are illustrative only and are not intended to imply that great precision is required. For example, the dimension D may be much larger than indicated without seriously impairing the usefulness of the feeder. Moreover, it is recognized that any set of dimensions selected will inherently exclude from feeding directly from the troughs 32 a portion of the quail population, especially immature birds. An interesting aspect of this invention is that it inherently provides for at least some feeding of such excluded portions of the quail population. These birds generally accompany the mature quail which feed from the troughs. Accordingly, they are present to pick up any grain spilled by the feeding birds, grain which might otherwise be scavenged by less desirable species.

The aforedescribed construction offers many advantages, of which the following are illustrative. The enclosed feeding chamber 12 protects the grain 21 and the troughs 32 from the weather, assuring ice-free feed. The enclosed area 12 also intimidates many animals and birds who will not enter such a space and excludes others due to their size. Small birds are prevented from alighting on the feed troughs 32 by the barrier plate 41 which also bars small animals, such as rodents, from access to the grain 21. The troughs 32 are sufficiently spaced (dimension B) from the ground that small birds and animals cannot reach them. From this standpoint, a solid base plate 46, such as that illustrated, is important. A sheet metal floor prevents smaller animals from excavating to build up the floor, thereby gaining access to the feed. The access opening defined by the barrier member 42 and spill guard 33 (dimension C) absolutely excludes birds with large heads and/or long beaks from feeding, while the relationship of dimensions B and D assist in excluding large birds with legs located further forward on their bodies than those of a quail.

In certain embodiments of the invention, the spill guard 33 is provided with means, such as serrated edges or a rolling rod, to discourage pawing of feed by rodents. It is also within contemplation to adjust the height of the spill guard 33 and/or the top of the feed openings 30, depending on the stack angle (angle of repose) of the grain used, to ensure substantial filling of the troughs 32 without spillage.

Reference herein to details of the illustrated embodiment is not intended to limit the scope of the appended claims which themselves recite the features regarded as essential to the invention. For example, although the invention is illustrated with opposing, parallel feed troughs, embodiments having a single such trough are within contemplation.

I claim:

1. A quail feeder comprising:
    a feeding chamber with opposing side walls;
    a storage chamber mounted atop said feeding chamber with an opening in communication therebetween to permit the flow of grain from said storage chamber down into said feeding chamber;
    a distribution chamber mounted within and at the top of said feeding chamber to receive grain from said storage chamber and including a side approximately parallel an adjacent side wall of said feeding chamber, said side being provided with opening means to permit the flow of grain therethrough along substantially its entire length;
    a trough disposed near the top of said feeding chamber to receive grain from said distribution chamber through said opening means and extending approximately parallel said adjacent side wall of the feeding chamber for substantially the entire length of the distribution chamber; and
    trough guard means including a barrier member depending in spaced, approximately parallel relationship with said trough so that access to said trough by a bird requires insertion of the head up between said trough and said barrier member.

2. A quail feeder according to claim 1 including an upstanding panel at the distal end of said trough comprising spill guard means.

3. A quail feeder according to claim 1 wherein said distribution chamber includes opposing sides approximately parallel respective side walls of said feeding chamber, a trough is disposed approximately parallel each said side wall, and said trough guard means includes barrier members depending in said relationship with each said spaced trough.

4. A quail feeder according to claim 1 including a solid base plate member constituting a floor for said feeding chamber.

5. A quail feeder according to claim 1 wherein the spacing between the distal end of the trough and the barrier member (dimension C) is selected to exclude the heads of birds with heads substantially larger or beaks substantially longer than mature quail in the region of use.

6. A quail feeder according to claim 1 including a spill guard upstanding from the distal end of the trough wherein the vertical distance of the spill guard from the base of the feeding chamber (dimension B) is selected to exclude from the trough birds substantially shorter than mature quail in the region of use.

7. A quail feeder according to claim 6 wherein the vertical distance between the base of the feeding chamber and the trough guard (dimension A) is selected with respect to dimension B to exclude heads substantially larger than those of mature quail in the region of use.

8. A quail feeder according to claim 7 wherein dimension C is selected to exclude heads and beaks substantially larger than those of mature quail in the region of use.

9. A quail feeder according to claim 8 wherein said opening means in the side of the distribution chamber are apertures, and the elevation of the tops of said apertures is selected with respect to said spill guard, depending on the normal stack angle of the grain in the feeder to ensure substantial filling of the trough without spillage over said spill guard.

10. A quail feeder according to claim 9 wherein the upper edge of said spill guard carries means to discourage pawing of feed by rodents.

* * * * *